(12) United States Patent
Lee et al.

(10) Patent No.: US 12,506,707 B2
(45) Date of Patent: Dec. 23, 2025

(54) SYSTEM AND METHOD FOR CONNECTING TO AND MANAGING CONNECTIONS TO INSTANCES IN MULTI-NETWORK ENVIRONMENT

(71) Applicant: SAMSUNG SDS CO., LTD., Seoul (KR)

(72) Inventors: Kwang Hee Lee, Seoul (KR); Kwang Hui Hong, Seoul (KR); Han Soo Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 41 days.

(21) Appl. No.: 18/674,247

(22) Filed: May 24, 2024

(65) Prior Publication Data

US 2024/0396786 A1  Nov. 28, 2024

(30) Foreign Application Priority Data

May 26, 2023 (KR) .................. 10-2023-0068438

(51) Int. Cl.
*H04L 9/40* (2022.01)
*H04L 41/042* (2022.01)
*H04L 43/16* (2022.01)
*H04L 67/1031* (2022.01)

(52) U.S. Cl.
CPC ........ *H04L 63/0209* (2013.01); *H04L 41/042* (2013.01); *H04L 43/16* (2013.01); *H04L 63/1425* (2013.01); *H04L 67/1031* (2013.01); *H04L 63/0218* (2013.01)

(58) Field of Classification Search
CPC ..... H04L 41/08; H04L 41/0895; H04L 43/20; H04L 63/02–029; H04L 67/1004–1038
See application file for complete search history.

(56) References Cited

U.S. PATENT DOCUMENTS

| | | | |
|---|---|---|---|
| 10,511,584 B1 * | 12/2019 | Baer | H04L 63/029 |
| 10,719,369 B1 * | 7/2020 | Aithal | G06F 9/45558 |
| 11,323,477 B1 * | 5/2022 | Kumar | H04L 63/168 |
| 2011/0225641 A1 | 9/2011 | Wu et al. | |
| 2016/0205518 A1 * | 7/2016 | Patel | G06F 9/45558 455/518 |
| 2017/0053076 A1 * | 2/2017 | Lulla | G06Q 40/08 |

(Continued)

FOREIGN PATENT DOCUMENTS

| KR | 10-2383998 B1 | 4/2022 |
|---|---|---|
| KR | 10-2022-0164485 A | 12/2022 |

*Primary Examiner* — Brendan Y Higa
(74) *Attorney, Agent, or Firm* — Sughrue Mion, PLLC

(57) ABSTRACT

A method of connecting to and managing connections to instances in a multi-network environment includes: accessing, by a bastion host, a bastion worker among bastion workers, the bastion workers being included in subnets of a plurality of networks, and connecting to a target instance connected with the accessed bastion worker; monitoring, by the bastion host, a connection to the target instance; and comparing, by the bastion host, a traffic of a subnet, in which the target instance is located, with a predefined threshold, and adjusting a number of a bastion worker included in the subnet, in which the target instance is located, based on a result of the comparing, wherein the traffic includes data obtained from a result of the monitoring the connection to the target instance.

20 Claims, 11 Drawing Sheets

(56) References Cited

U.S. PATENT DOCUMENTS

| | | | |
|---|---|---|---|
| 2018/0152448 A1 | 5/2018 | Fitzgerald et al. | |
| 2020/0304502 A1 | 9/2020 | Jafari et al. | |
| 2020/0314177 A1* | 10/2020 | Kipp | H04L 9/0861 |
| 2023/0062052 A1* | 3/2023 | Sheshadri | H04L 63/0272 |
| 2023/0129430 A1* | 4/2023 | Reiter | G06Q 10/1053 |
| | | | 705/321 |
| 2024/0155003 A1* | 5/2024 | Gulati | H04L 63/083 |
| 2024/0406140 A1* | 12/2024 | Lee | H04L 63/083 |
| 2025/0080453 A1* | 3/2025 | Arora | H04L 43/0882 |

\* cited by examiner

SYSTEM AND METHOD FOR CONNECTING TO AND MANAGING CONNECTIONS TO INSTANCES IN MULTI-NETWORK ENVIRONMENT

CROSS-REFERENCE TO RELATED APPLICATION

This application claims priority from Korean Patent Application No. 10-2023-0068438 filed on May 26, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a system and method for connecting to and managing connections to instances in a multi-network environment, and more particularly, to a system and method for connecting to and managing connections to instances located in a plurality of networks, through a single bastion host in a cloud service.

2. Description of the Related Art

Typically, connecting to instances within a network such as a Virtual Private Cloud (VPC) in cloud services requires a public IP. However, the number of public IPs is limited, and using public IPs exposes internal instance information to the outside, making it vulnerable to security threats. To mitigate this, users can connect to instances within the internal network of a cloud service via a bastion host, which acts as a gateway between external and internal networks.

The bastion host needs to be installed across all networks where instances desired by the users are configured. Thus, the users need to directly manage all account information for connecting to the internal instances and execute Secure Shell (SSH) tunneling whenever connecting to each instance. Additionally, when a bastion host is installed in only one network, rather than in each and every network, routing settings such as VPC peering are required between the network where the bastion host is installed and other networks. In other words, there is a need for a method for connecting to and managing connections to instances in a multi-network environment that uses a bastion host while minimizing the exposure of information of instances located in networks, and that allows for easy security settings and management.

SUMMARY

Aspects of the present disclosure provide a system and method for connecting to and managing connections to instances connected with bastion workers by accessing bastion workers located in multiple networks of a multi-network environment through a single bastion host in cloud services.

Aspects of the present disclosure also provide a system and method for connecting to instances in a multi-network environment, which can minimize security risks by preventing communication from external networks to the user network of a cloud service and avoiding the exposure of information of instances existing in external networks.

Aspects of the present disclosure also provide a method for distributing network loads and optimizing operations by adjusting the number of bastion workers based on the traffic of subnets.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an example embodiment, provided is a method of connecting to and managing connections to instances in a multi-network environment, the method including: accessing, by a bastion host, a bastion worker among bastion workers, the bastion workers being included in subnets of a plurality of networks, and connecting to a target instance connected with the accessed bastion worker; monitoring, by the bastion host, a connection to the target instance; and comparing, by the bastion host, a traffic of a subnet, in which the target instance is located, with a predefined threshold, and adjusting a number of a bastion worker included in the subnet, in which the target instance is located, based on a result of the comparing, wherein the traffic includes data obtained from a result of the monitoring the connection to the target instance.

The connecting to the target instance may include: performing, by a bastion Equipment Account Management System (EAMS) of the bastion host, a user authentication; receiving, by a bastion manager of the bastion host, a request to connect to the target instance; in response to the request to connect to the target instance, transmitting, by the bastion manager, a request for connection specifications to the bastion EAMS; generating and transmitting, by the bastion EAMS, the connection specifications to the bastion manager, in response to the request for connection specifications; searching for and locating a bastion worker, among the bastion workers, that is connected to the target instance; and accessing the located bastion worker by using the connection specifications.

The connection specifications may include a domain of a network in which the target instance is located, an IP address and a port number of the target instance, an ID and a password of a user, and at least one setting associated with the monitoring the connection to the target instance.

The accessing the located bastion worker may include transmitting the connection specifications to the located bastion worker in a JSON format.

The connecting to the target instance may include: transmitting a request to connect to the target instance through the accessed bastion worker; transmitting the connection specifications in JSON format to the located bastion worker; and recording, based on the connecting to the target instance being successful, connection start information, the connection start information including a name and an IP address of the target instance, a connection protocol used, a name and an account information of a user, an IP address of a user terminal, an ID of the target instance, and a connection start time.

The method may further include: based on the connection to the target instance being terminated, recording connection termination information in a storage, wherein the connection termination information includes the IP address of the target instance, the connection protocol used, the ID and the account information of the user, the IP address of the user terminal, and a connection termination time.

The monitoring the connection to the target instance may include: measuring the traffic of the subnet in which the target instance is located; providing, to a user, a connection log file that includes one or more operations performed by the user upon the connecting to the target instance; and providing, to the user, a connection history file, the connection history file being a video file that records operations performed through the bastion host up to a point of the connecting to the target instance.

The providing the connection log file may include: in response to a request to download the connection log file from the user, transmitting, by a bastion manager of the bastion host, a request for the connection log file to the accessed bastion worker; receiving, by the bastion manager, the connection log file from the accessed bastion worker; preprocessing, by the bastion manager, control codes of the connection log file; and transmitting, by the bastion manager, the connection log file to the user.

The providing the connection history file may include: in response to a request to play the connection history file from the user, transmitting, by a bastion manager of the bastion host, a request for the connection history file to the accessed bastion worker; receiving, by the bastion manager, the connection history file from the accessed bastion worker; and rendering, by the bastion manager, the connection history file and transmitting the rendered connection history file to the user.

The adjusting the number of the bastion worker may include additionally deploying at least one bastion worker in the subnet based on the traffic of the subnet exceeding the predefined threshold.

The additionally deploying at least one bastion worker may include: registering, by a bastion manager of the bastion host, network information for the subnet in which the at least one bastion worker is to be additionally deployed; and transmitting a request to install a container image corresponding to the at least one bastion worker to be deployed.

The container image corresponding to the at least one bastion worker to be additionally deployed may be pulled from a container repository that is Kubernetes (K8s) or a Docker repository.

According to an aspect of an example embodiment, provided is a system for connecting to and managing connections to instances in a multi-network environment, wherein each of a plurality of networks includes a bastion worker and a plurality of instances connected with the bastion worker, the system including: a user network including a bastion host for a user to access bastion workers included in a plurality of networks, wherein the bastion host includes: a bastion Equipment Account Management System (EAMS) configured to perform a user authentication on the user and transmit a request to connect to a target instance among the plurality of instances; and a bastion manager configured to search for and locate a bastion worker connected with the target instance, in response to the request to connect to the target instance from the bastion EAMS; access the located bastion worker, measure traffic of a subnet, in which the target instance is located, and compare the measured traffic with a predefined threshold; and adjust a number of a bastion worker included in the subnet, in which the target instance is located, based on a result of the comparing.

Upon a request from the bastion manager, the bastion EAMS may be configured to generate and delivers specifications to the bastion manager, and the bastion manager may be configured to access the located bastion worker by using connection specifications.

The connection specifications may include a domain of a network where the target instance is located, an IP address and a port number of the target instance, an ID and a password of the user, and settings associated with monitoring of a connection to the target instance.

The bastion manager may include a connection monitoring module, configured to provide, to the user, a connection log file that includes one or more operations performed by the user upon the connecting to the target instance, and configured to provide, to the user, a connection history file that is a video file that records operations performed through the bastion host up to a point of connecting to the target instance.

The bastion manager may include a deployment module, configured to deploy one of the bastion workers as a container image and additionally deploy at least one other bastion worker based on the traffic exceeding the predefined threshold.

The bastion worker may include a web proxy container and a network proxy, each of the bastion workers may be implemented as a container image on the web proxy container, and the bastion manager may be configured to connect to the target instance through the network proxy according to a traffic routed from the bastion manager.

The container image may be received from a container repository upon a deployment request from the bastion manager, and the container repository may be Kubernetes (K8s) or a Docker repository.

According to an aspect of an example embodiment, provided is a non-transitory computer-readable recording medium storing computer program executable by at least one processor to perform: accessing a bastion worker among bastion workers, the bastion workers being included in subnets of a plurality of networks, and connecting to a target instance connected with the accessed bastion worker; monitoring a connection to the target instance; and comparing a traffic of a subnet, in which the target instance is located, with a predefined threshold, and adjusting a number of a bastion worker included in the subnet, in which the target instance is located, based on a result of the comparing, wherein the traffic includes data obtained from a result of the monitoring.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
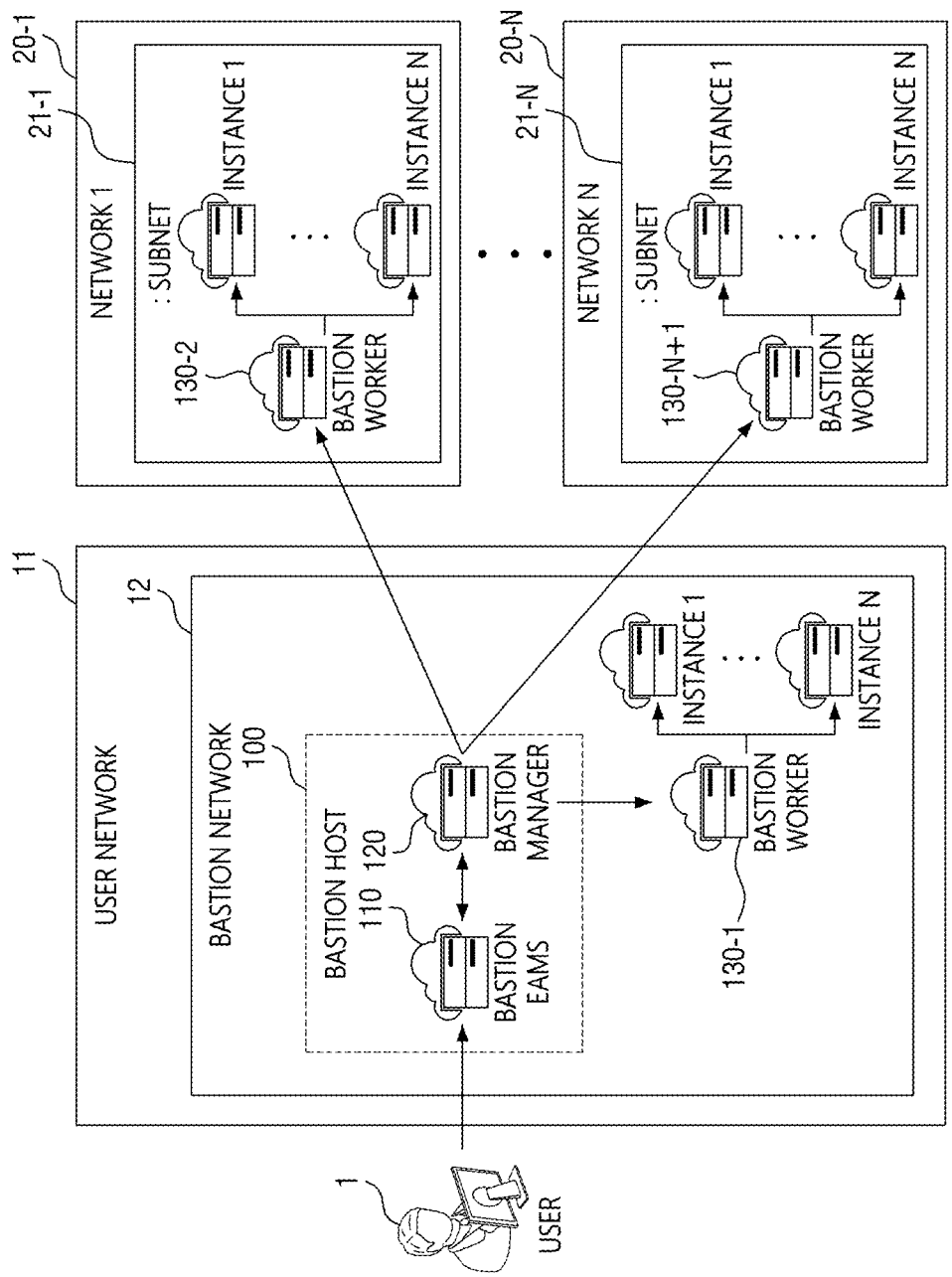
FIG. 1 is a block diagram of a system for connecting to and managing connections to instances in a multi-network environment according to an embodiment of the present disclosure.

Preferred embodiments of the present disclosure will hereinafter be described in detail with reference to the accompanying drawings. The advantages, features, and methods of achieving them of the present disclosure will become clearer with the embodiments described in detail along with the accompanying drawings. However, the present disclosure is not limited to the embodiments described below and can be implemented in various different forms. These embodiments are provided only to make the disclosure complete and fully inform those of ordinary skill in the technical field to which the present disclosure belongs, and the present disclosure is defined only by the scope of the claims.

It is noted that the same reference numerals are used for the same elements across different drawings as far as possible. Furthermore, in describing the present disclosure, detailed descriptions of known configurations or functions will be omitted when they may obscure the essence of the present disclosure.

Unless defined otherwise, all terms used herein (including technical and scientific terms) can have the meaning commonly understood by one of ordinary skill in the art to which the present disclosure belongs. Terms defined in commonly used dictionaries are not interpreted in an ideal or excessive manner unless explicitly defined otherwise. The terms used in the present specification are for the purpose of describing particular embodiments only and are not intended to limit the invention. In this specification, the singular forms include plural forms unless the context clearly indicates otherwise.

Furthermore, in describing the components of the present disclosure, terms such as first, second, A, B, (a), (b), etc., may be used. These terms are intended to distinguish the components from others, and the essence, order, or sequence of such components is not limited by these terms. If a component is stated as being "connected," "coupled," or "linked" to another component, the component can be directly connected or linked to the other component, but it should be understood that there may also exist other components "connected," "coupled," or "linked between them.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this specification, a cloud service refers to an on-demand outsourcing service that provides various IT resources such as a server, storage, and software to users. For example, a cloud service providing a storage saves various data in the storage of a service provider server connected to a network and allows it to be downloaded via the network as needed. Such cloud service may be Infrastructure as a Service (IaaS) that provides a virtualized infrastructure environment to users or Software as a Service (SaaS) that provides application software over the Internet, but the present disclosure is not limited thereto.

FIG. 1 is a block diagram of a system 10 for connecting to and managing connections to instances in a multi-network environment according to an embodiment of the present disclosure. For example, the system 10 of FIG. 1 may be a system for connecting to and managing connections to instances within a cloud service's multi-network environment, and a user 1 may be an administrator of the cloud service.

Referring to FIG. 1, the system 10 may include a user network 11 and a plurality of networks 20-1 through 20-N, the user network 11 may include a bastion subnet 12, and each of the networks 20-1 through 20-N may include subnets 21-1 through 21-N. The bastion subnet 12 may include a bastion host 100, and each of the bastion subnet 12 and the subnets 21-1 through 21-N may include one of bastion workers 130-1 through 130-N+1 and a plurality of instances. The bastion workers 130-1 through 130-N+1 and the plurality of instances may have distinct IP addresses.

Each network is illustrated in FIG. 1 as including a single subnet, but the present disclosure is not limited thereto. Alternatively, each network may include a plurality of subnets. Also, FIG. 1 illustrates that each subnet includes N instances, but the present disclosure is not limited thereto. The number of instances included in each subnet may vary.

The user 1 may access the user network 11 and may thereby connect to the instances connected with each of the bastion workers 130-1 through 130-N+1 through a single bastion host 100, which is positioned in the bastion subnet 12. For convenience of description, any arbitrary bastion worker or all the bastion workers 130-1 through 130-N+1 will hereinafter be collectively referred to as the bastion worker(s) 130.

The user 1 may access the user network 11 through a browser on their user terminal. For example, the user terminal may include a smartphone, tablet PC, laptop, etc., but the present disclosure is not limited thereto. The user terminal may encompass any type of computing device equipped with computing and communication means. Moreover, the user network 11 and the networks 20-1 through 20-N may be virtual private cloud (VPC) networks, on-premise networks, or cloud service provider (CSP) networks, but the present disclosure is not limited thereto. The user network 11 and the networks 20-1 through 20-N may communicate through an Internet gateway or using VPC peering for communication.

The user network 11 is a network that enables the user 1 to connect to, and manage connections to, instances in a multi-network environment, and may include the bastion subnet 12 and the bastion host 100. The bastion subnet 12 is a subnet within the user network 11 that includes the bastion host 100. The bastion host 100 may include a bastion Equipment Account Management System (EAMS) 110 and a bastion manager 120. For example, the user 1 may access the user network 11 via Hypertext transfer protocol secure (HTTPS).

As mentioned above, the user 1 may access the bastion workers 130-1 through 130-N+1, which are located in the bastion subnet 12 or in the subnets 21-1 through 21-N through the bastion host 100, and may connect to the instances connected with each of the bastion workers 130-1 through 130-N+1. An instance that the user 1 wishes to connect to will hereinafter be referred to as a target instance.

The bastion EAMS 110 performs user authentication on the user 1 who has connected thereto via the browser, manages information related to user authentication, and upon successful authentication of the user 1, may send a request to the bastion manager 120 to connect to the target instance.

The bastion manager 120 may hold information on the bastion workers 130-1 through 130-N+1 that are deployed. Upon a connection request from the bastion EAMS 110, the bastion manager 120 may search for and find the bastion worker 130 connected with the target instance, may send a request for connection specifications, which are connection-related information (e.g., IP address of the target instance, the user 1's ID and password, etc.), to the bastion EAMS 110, and may deliver connection traffic and generated connection specifications to the found bastion worker 130 to access the corresponding bastion worker 130. Furthermore, the bastion manager 120 may monitor connections to the target instance to measure traffic or review connection records. Additionally, the bastion manager 120 may control an input command from the user 1 based on the level of the input command.

A bastion worker 130 may access connected instances based on the connection traffic and the user 1's connection specifications, received from the bastion manager 120. For example, the bastion worker 130 may be deployed in the subnets 21-1 through 21-N as a container image by the bastion EAMS 110 and the bastion manager 120.

Furthermore, FIG. 1 illustrates that each of the bastion subnet 12 and the subnets 21-1 through 21-N includes a single corresponding bastion worker, i.e., the bastion subnet 12 includes the bastion worker 130-1, while the subnets 21-1 through 21-N include the bastion workers 130-2 through 130-N+1, respectively, but the present disclosure is not limited thereto. The number of bastion workers may be dynamically adjusted depending on, for example, the traffic of each subnet. For example, if the traffic of the subnet 21-1 increases beyond a predefined threshold, causing an increase in the load on the bastion worker 130-1, an additional bastion worker may be deployed in the subnet 21-1 to reduce the number of instances connected with each bastion worker 130, thereby distributing the load. Conversely, if the traffic of the subnet 21-1 decreases, the additional bastion worker may be removed. An embodiment of dynamically adjusting the number of bastion workers 130 will be described later in further detail with reference to FIG. 5.

In an embodiment of the present disclosure, the bastion EAMS 110 and the bastion manager 120 may be implemented as separate web servers, and the bastion EAMS 110 and the bastion manager 120 may communicate with each other bidirectionally. However, between the bastion manager 120 and the bastion worker 130, only unidirectional communication from the bastion manager 120 to the bastion worker 130 is possible, and communication from the bastion worker 130 to the bastion manager 120 is blocked, making the user network 11 inaccessible from the outside. In this manner, security risks can be minimized.

Figure 2:
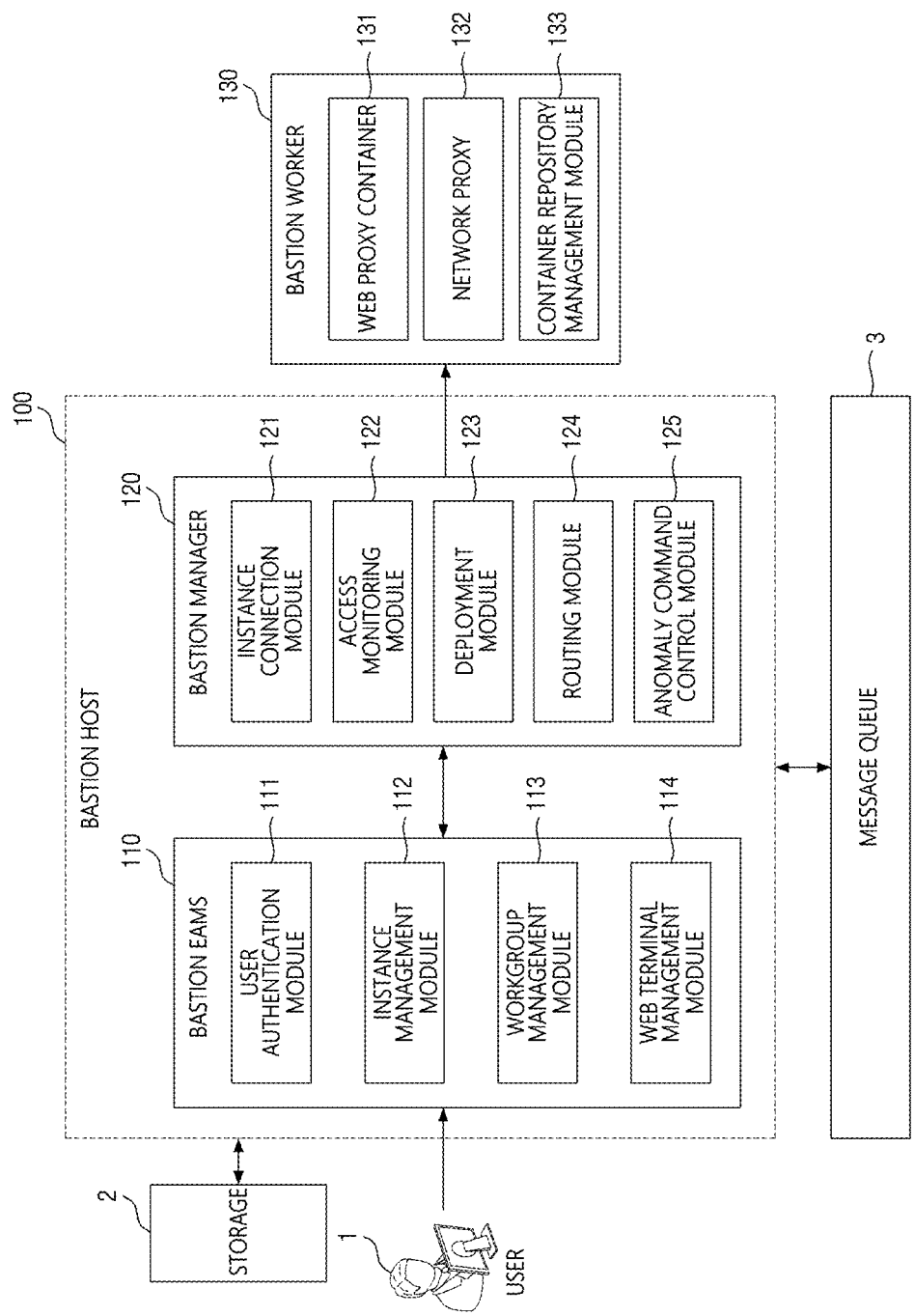
FIG. 2 is a block diagram illustrating the configurations of a bastion host and a bastion worker according to an embodiment of the present disclosure.

FIG. 2 is a block diagram illustrating the configurations of the bastion host 100 and a bastion worker 130 according to an embodiment of the present disclosure. The components (or modules) of each of the bastion EAMS 110, the bastion manager 120, and the bastion worker 130 of FIG. 2 represent functionally distinct elements, and it should be noted that at least one component (or module) of each of the bastion EAMS 110, the bastion manager 120, and the bastion worker 130 may be physically integrated with one another in a real-world physical environment.

The bastion EAMS 110 may provide a page for connection management and web terminal settings through the mapping between the user 1 and a target instance, and may include user authentication- and instance-related information. The bastion manager 120 and the bastion worker 130 perform an operation for an actual instance connection. Specifically, the bastion manager 120 may deliver connection traffic to the bastion worker 130 in a multi-network environment based on information received from the bastion EAMS 110, and the bastion worker 130, located in the same subnet as the target instance, may proceed with instance authentication and connection. The individual components and their operations of each of the bastion EAMS 110, the bastion manager 120, and the bastion worker 130 will hereinafter be described.

The bastion EAMS 110 includes a user authentication module 111, which is for performing user authentication (e.g., authentication through user ID and password, biometric authentication, authentication through electronic signature, etc.) and managing user authentication-related information, an instance management module 112, which is for storing information of instances included in networks (e.g., IP addresses) and sending a request to connect to the target instance, a workgroup management module 113, which is for managing the user 1's workgroups, and a web terminal management module 114, which is for managing the web terminal on which the bastion EAMS 110 operates. Additionally, as will be described later, the bastion EAMS 110 may generate connection specifications upon a request from the bastion manager 120.

The bastion manager 120 may include an instance connection module 121, which is for searching for the bastion worker 130 connected with the target instance, and requesting and delivering connection specifications needed for connecting to the target instance. For example, the connection specifications may include: connection information such as a target network domain necessary for connecting to the target instance, the IP address and port number of the target instance, and the user 1's ID and password; security policies such as settings for anomaly commands, watermark display, and connection history recording settings; and web terminal settings such as terminal timeout duration, the activation status of a file transfer functionality, and scroll line settings. For example, the instance connection module 121 may deliver the connection specifications in JSON format to the bastion worker 130 connected with the target instance.

Additionally, the bastion manager 120 may include a connection monitoring module 122, which is for, in response to a connection monitoring request from the user 1, measuring traffic within each subnet, downloading a connection log file, and playing a connection history file. In this specification, the connection log file refers to a file containing operations performed by the user 1 upon connecting to an arbitrary target instance, and the connection history file refers to a video file recording operations performed through the web terminal by the user 1 up to the point of connecting to the arbitrary target instance. The connection log file and the connection history file may be stored in an external storage 2. Meanwhile, the measured traffic may be used to adjust the number of bastion workers 130 on each subnet.

Furthermore, the bastion manager 120 may include a deployment module 123, which is for distributing the bastion workers 130 as container images across networks, a routing module 124, which is for routing traffic to the deployed bastion workers 130 across the networks, and an anomaly command control module 125, which is for controlling an input anomaly command based on its level.

The deployment module 123 may perform a distribution operation based on certificates (e.g., an x.509 certificates (SAN:*.connector.io)) issued between the bastion manager 120 and the bastion workers 130. The routing module 124 may distribute load in a least connection manner using a dynamic routing method that preferentially routes traffic to bastion workers 130 with fewer concurrent connections. However, the routing module 124 may also use a static routing method in anticipation that particular bastion workers 130 are down. Through such traffic routing, the bastion manager 120 may access the bastion worker 130.

Referring further to FIG. 2, the bastion worker 130 may include a web proxy container 131 and a network proxy 132. The bastion worker 130 may be implemented in the web proxy container 131 as a container image, and the container image may be received from an external container repository, such as Kubernetes (K8s) or a Docker repository, upon a distribution request from the deployment module 123 of the bastion manager 120. The bastion worker 130 may further include a container repository management module 133, which is for managing the external container repository.

Specifically, the bastion worker 130 may connect to the target instance through the network proxy 132 based on the connection specifications and traffic routed from the bastion manager 120. The target instance may proceed with an authentication procedure through a standard Internet protocol (e.g., SSH/RDP protocol, Telnet protocol, etc.), and may provide a terminal screen to the user 1.

Furthermore, as explained earlier with reference to FIG. 1, the number of bastion workers 130 may be dynamically adjusted based on the traffic, load, and network characteristics of each subnet. For example, if the traffic in each subnet exceeds a predefined threshold, the number of bastion workers 130 may be increased, thereby reducing the number of instances connected with each bastion worker 130 and distributing the load. Conversely, if the traffic of the corresponding subnet decreases, the number of bastion workers 130 may be lowered back. The number of bastion workers 130 may be increased or lowered by adjusting the distribution of the bastion workers 130 by the bastion manager 120.

All the necessary information and generated files during the operations of the bastion EAMS 110, the bastion manager 120, and the bastion worker 130 may be stored in the storage 2. Moreover, the bastion EAMS 110, the bastion manager 120, and the bastion worker 130 may exchange data through a message queue 3.

The bastion host 100 may be implemented on at least one computing device. For example, all functions of the bastion host 100 may be implemented on a single computing device. Alternatively, in another example, some functions of the bastion host 100 may be implemented on a first computing device, and other functions may be implemented on a second computing device. Yet alternatively, in yet another example, a particular of the bastion host 100 may be implemented across multiple computing devices. Here, the term "computing device" may encompass nearly any arbitrary device equipped with computing capabilities, and an exemplary computing device that can implement the bastion host 100 will be described later with reference to FIG. 11.

Figure 3:
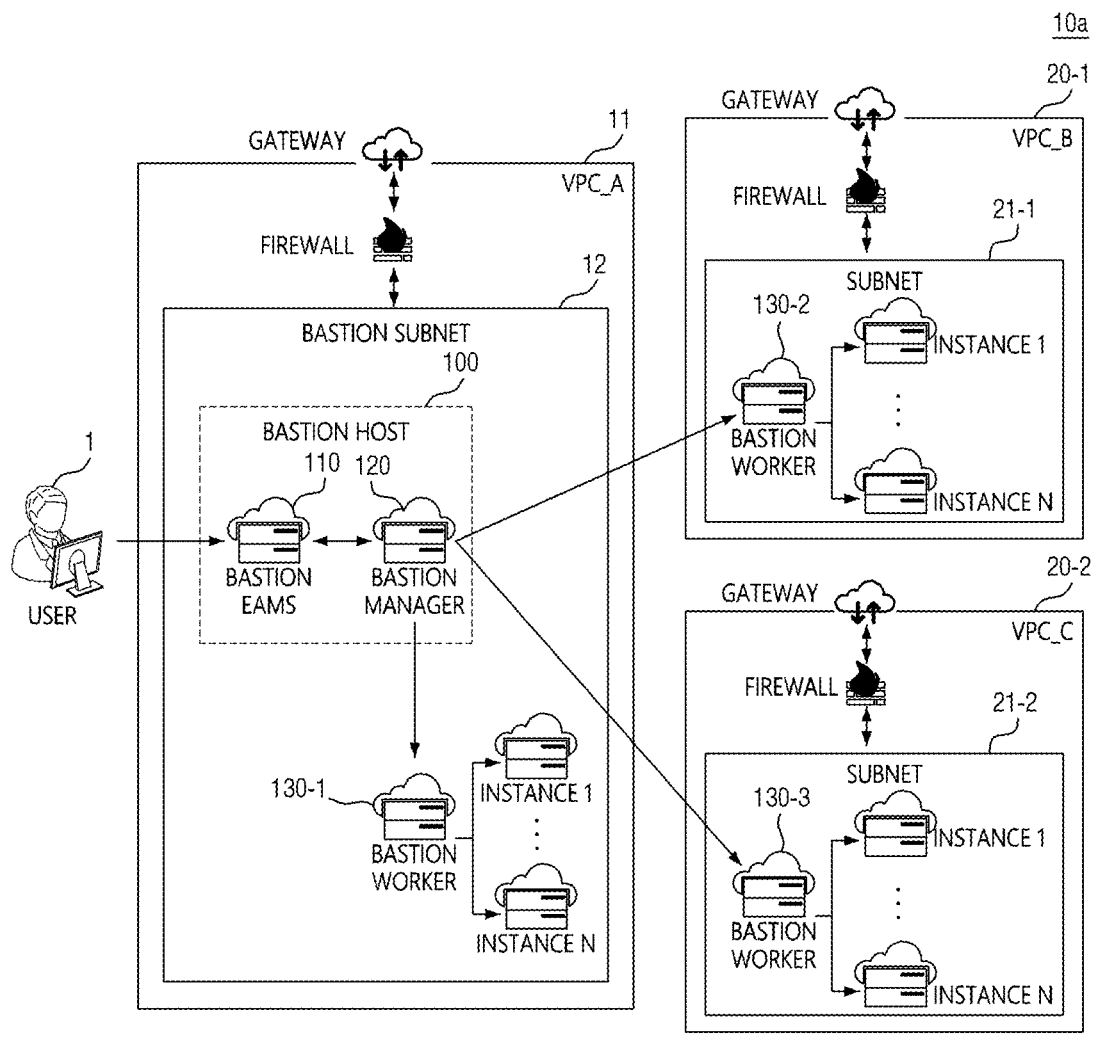
FIG. 3 conceptually illustrates an embodiment where a user connects to instances in each network within a multi-network environment that consists of networks of the same type.

FIG. 3 conceptually illustrates an embodiment where a user connects to instances in each network within a multi-network environment that consists of networks of the same type. For example, it is assumed that all networks (11, 20-1, and 20-2) included in a system 10a of FIG. 3 are VPC networks, with a network 11 ("VPC-A") corresponding to the user network 11 of FIG. 1.

Referring to FIG. 3, the user 1 may connect to instances in the deployed networks through a bastion manager 120 and bastion workers 130-1, 130-2, and 130-3 by accessing a bastion host 100 on a bastion subnet 12 of the network 11 via, for example, HyperText Transfer Protocol Secure (HTTPS)), without needing to connect to the instances via individual connection protocols (e.g., the SSH protocol) in a network 20-1 ("VPC-B") and a network 20-2 ("VPC-C").

Thus, the user 1 can connect to each target instance simply through user authentication via a bastion EAMS 110, without any specific information on the instances in the deployed networks (e.g., individual IDs and passwords for connecting to the instances, individual IP addresses of the instances, etc.), thus minimizing security risks because actual instance information is not exposed externally. Furthermore, using the aforementioned connection method through a single bastion host 100 can also minimize security risks associated with communication through VPC peering between VPC networks or through gateways.

Figure 4:
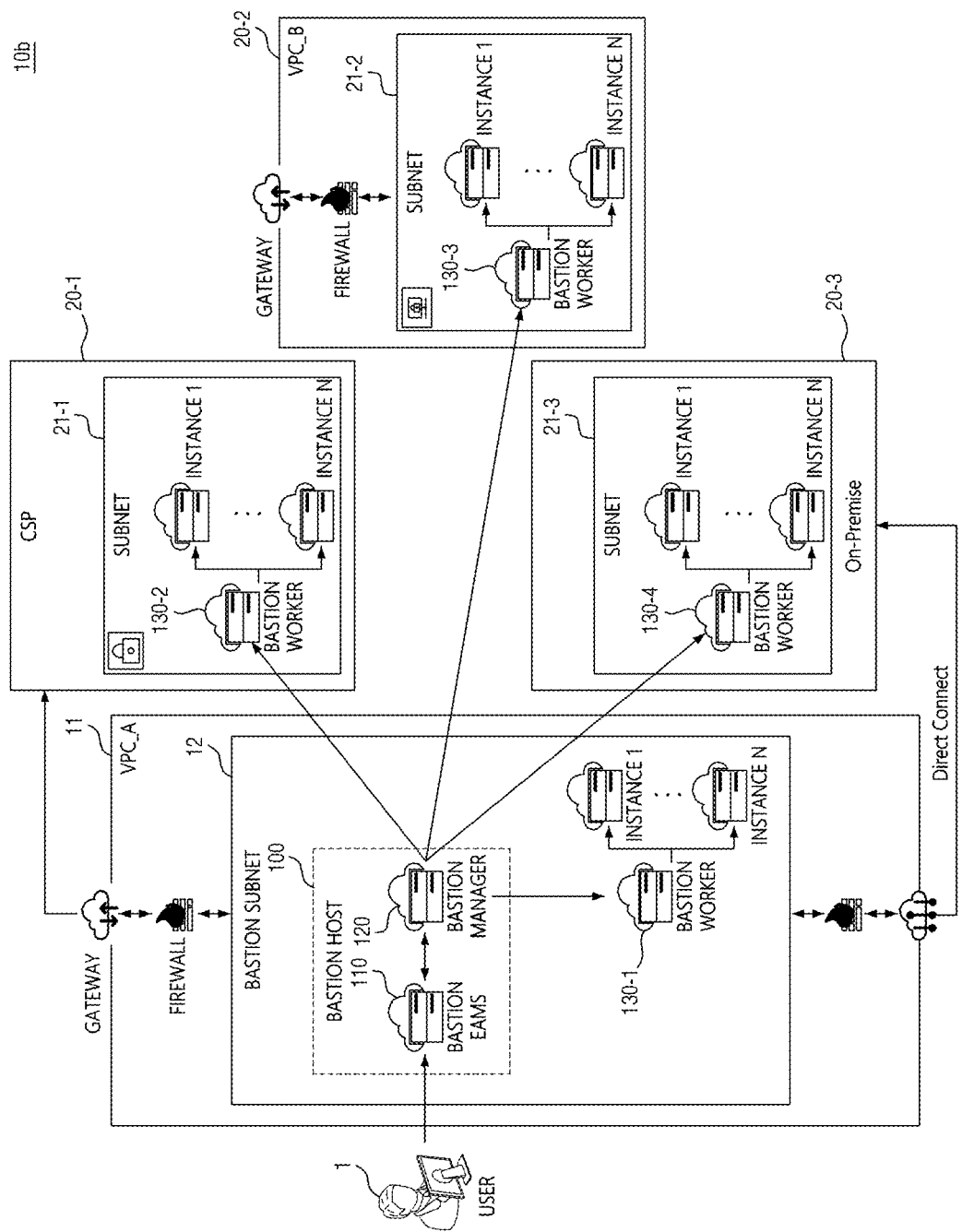
FIG. 4 conceptually illustrates an embodiment where a user connects to instances in each network within a multi-network environment that consists of networks of different types.

FIG. 4 conceptually illustrates an embodiment where a user connects to instances in each network within a multi-network environment that consists of networks of different types. In FIG. 4, unlike in FIG. 3, networks (11, 20-1, 20-2, 20-3) included in a system 10b of FIG. 4 differ in type. Specifically, it is assumed that a network 11 ("VPC-A") and a network 20-2 ("VPC-B") are VPC networks, a network 21-1 ("CSP") is a CSP network, and a network 21-3 is an on-premise network, with the network 11 corresponding to the user network 11 of FIG. 1.

In FIG. 4, like in FIG. 3, the user 1 may connect to instances in deployed networks through a single bastion host 100. A detailed description of the embodiment of FIG. 4 will be omitted because the embodiment of FIG. 4 is substantially the same as the embodiment of FIG. 3 except that the system 10b consists of different types of networks. As previously mentioned with reference to FIG. 3, the user 1 can connect to each target instance simply through user authentication via the bastion EAMS 110, without any specific information on the instances in the deployed networks (e.g., individual IDs and passwords for connecting to the instances, individual IP addresses of the instances, etc.), thus minimizing security risks because actual instance information is not exposed externally. Furthermore, using the aforementioned connection method through a single bastion host 100 can also minimize security risks associated with communication through VPC peering between VPC networks or through gateways, or with direct connections to on-premise networks.

Figure 5:
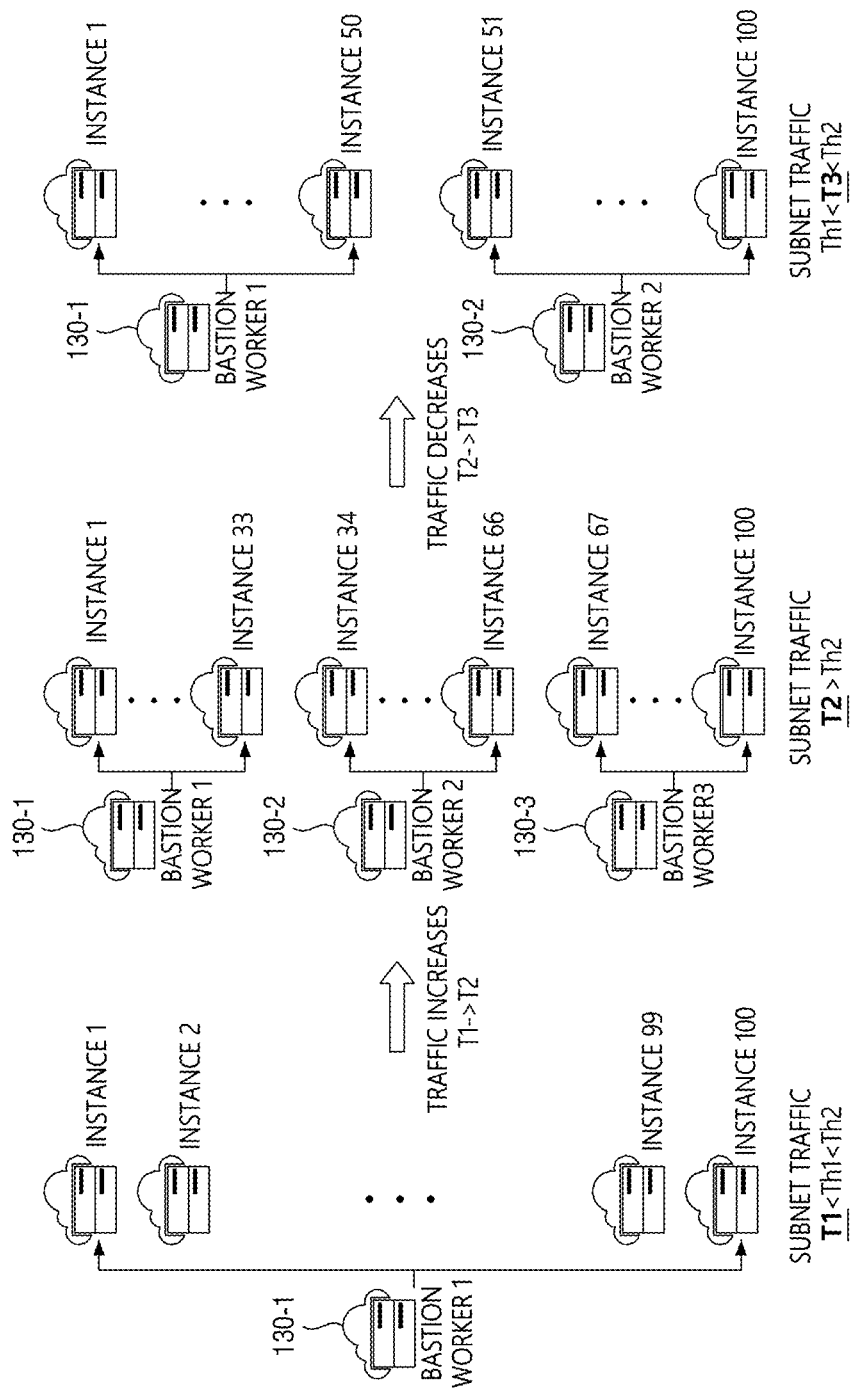
FIG. 5 illustrates an example where the number of bastion workers is dynamically adjusted according to changes in subnet traffic.

FIG. 5 illustrates an example where the number of bastion workers is dynamically adjusted according to changes in subnet traffic. For example, subnet traffic may be measured by the connection monitoring module 122 of the bastion manager 120 of FIG. 2. Referring to FIG. 5, it is assumed that subnet traffic is at T1 when a single bastion worker 130-1 is connected with all instances (i.e., instances 1 through 100) and the user accesses all the instances through the single bastion worker 130-1. It is also assumed that the subnet traffic changes from T1 to T2 to T3, a first threshold Th1 is the criterion for adjusting the number of bastion workers to three, and a second threshold Th2 is the criterion for adjusting the number of bastion workers to two.

If the subnet traffic increases from T1 to T2 that exceeds the first threshold Th1 (i.e., T2>Th1), resulting in increased load on the bastion worker 130-1, bastion workers 130-2 and 130-3 may be additionally deployed to reduce the number of instances connected per bastion worker. For example, the bastion worker 130-1 may be connected with instances 1 through 33, the bastion worker 130-2 may be connected with instances 34 through 66, and the bastion worker 130-3 may be connected with instances 67 through 100. Consequently, the load on the bastion worker 130-1 may be reduced.

Then, if the subnet traffic decreases from T2 to T3 that is less than the first threshold Th1 but exceeds the second threshold Th2 (i.e., Th2<T3<Th1), the bastion worker 130-3 may be removed, and only the bastion workers 130-1 and 130-2 may be used. For example, the bastion worker 130-1 may be connected with instances 1 through 50, and the bastion worker 130-2 may be connected with instances 51 through 100. As a result, the load on the bastion worker 130-1 may increase compared to when the subnet traffic is at T2, but may still decrease compared to when the subnet traffic is at T1. Such dynamic adjustments of bastion workers according to traffic changes can distribute network load and can optimize instance connection operations.

FIG. 5 illustrates an example of adjusting the number of bastion workers according to traffic changes, but the present disclosure is not limited thereto. That is, the number of bastion workers may be adjusted differently depending on the characteristics of each network or other factors influencing instance connections.

Figure 6:
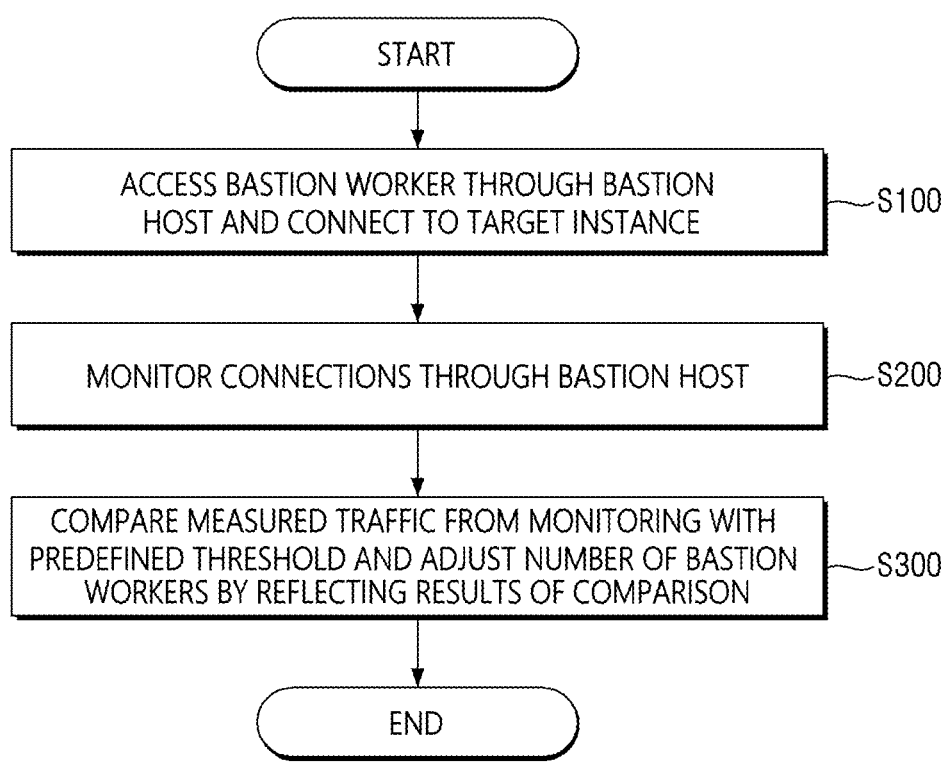
FIG. 6 is a flowchart illustrating a method of connecting to and managing connections to instances in a multi-network environment according to an embodiment of the present disclosure.

FIG. 6 is a flowchart illustrating a method of connecting to and managing connections to instances in a multi-network environment according to an embodiment of the present disclosure. The embodiment of FIG. 6 will hereinafter be described with reference to FIG. 1.

Referring to FIG. 6 and further to FIG. 1, in step S100, the user 1 may access a bastion worker 130 in each of the subnets of multiple networks through the bastion host 100 and may connect to the target instance. For example, the user 1 may access the bastion EAMS 110 first through the browser on the user terminal, may search for and find the bastion worker 130 connected with the target instance through the bastion manager 120, and access the found bastion worker 130 to connect to the target instance among a plurality of instances connected with the bastion worker 130. A series of operations related to step S100 will be described later with reference to FIGS. 7 and 8.

In step S200, the user 1 may perform connection monitoring through the bastion host 100. For example, connection monitoring may involve measuring the traffic of the subnet where the connected target instance is located, downloading a log file containing operations that have been performed by the user 1 through connection to any arbitrary target instance, and playing a connection history file, which is a video file recording operations that have been performed through the web terminal until connecting to any arbitrary target instance. For example, protocols such as SSH or Telnet may be used to connect to any arbitrary target instance. A series of operations related to step S200 will be described later with reference to FIG. 9.

In step S300, the bastion manager 120 may compare the traffic measured in step S200 with a predefined threshold and may adjust the number of bastion workers 130 based on the results of the comparison. For example, if the traffic increases and the loads on the bastion workers 130 increase, the bastion manager 120 may send a request for the deployment of additional bastion workers. A series of operations related to step S300 will be described later with reference to FIG. 10.

Figure 7:
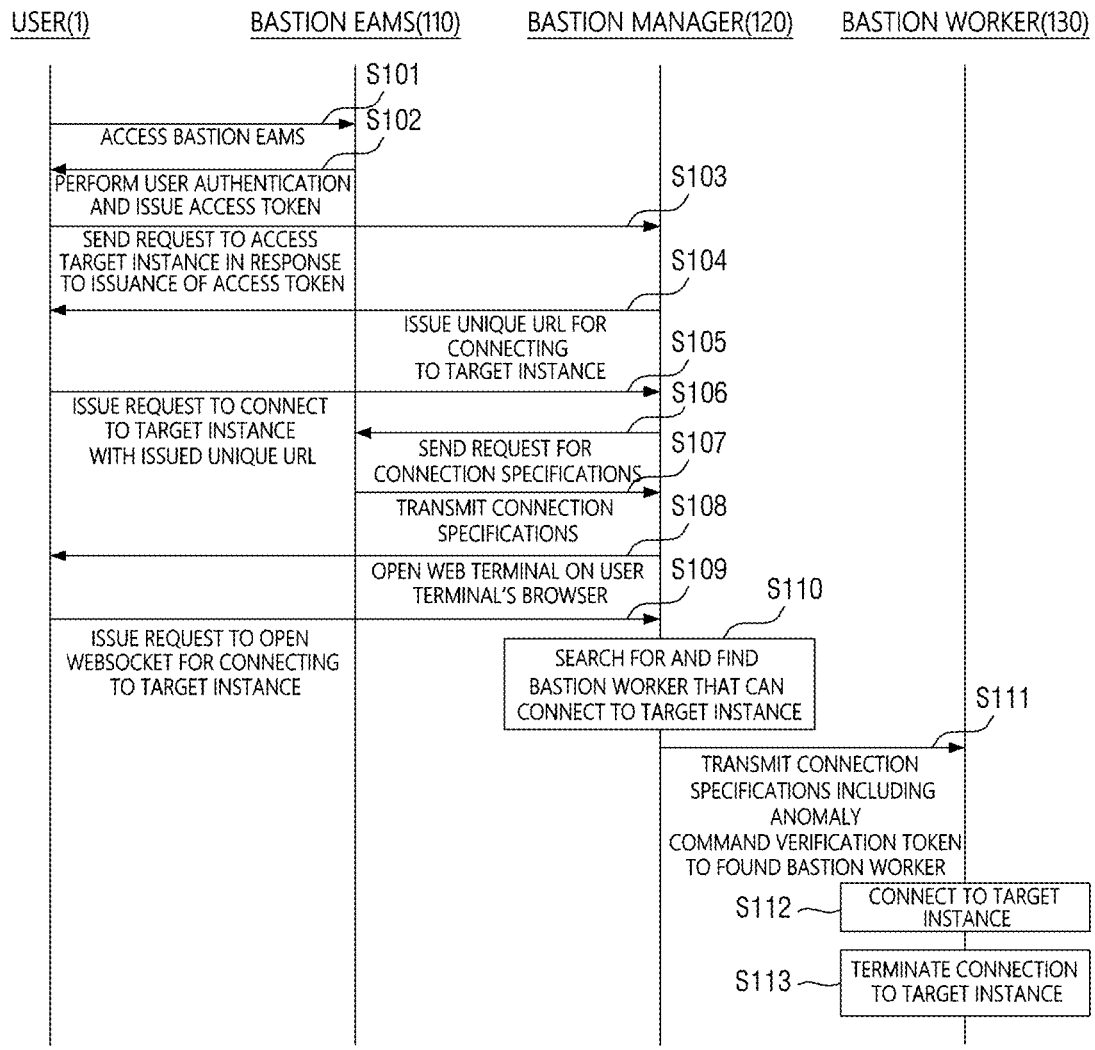
FIG. 7 is a flowchart illustrating step S100 of FIG. 6, which involves accessing a bastion worker through the bastion host and connecting to a target instance.

FIG. 7 is a flowchart illustrating step S100 of FIG. 6, which involves accessing a bastion worker 130 through the bastion host 100 and connecting to the target instance. The embodiment of FIG. 7 will hereinafter be described with reference further to FIGS. 1 and 2.

Referring to FIG. 7 and further to FIGS. 1 and 2, in step S101, the user 1 may access the bastion EAMS 110 through the browser on the user terminal. In step S102, the user authentication module 111 of the bastion EAMS 110 may perform user authentication for the user 1 and, upon completion of user authentication, issue an access token for server-to-server authentication. In step S103, upon issuance of the access token, the user 1 may send a request to connect to the target instance.

In step S104, the instance connection module 121 of the bastion manager 120 may issue a unique URL to the user 1 for connecting to the target instance. For example, the unique URL for access may be in the format of /connector/connectRemoteTerminal/{InstanceID}. An InstanceID value issued upon a connection request is a unique value that may be used as a key value for subsequent connection monitoring (for checking the connection log file and connection history file). In step S105, the user 1 may send a request to connect to the target instance with the issued unique URL.

In step S106, the instance connection module 121 of the bastion manager 120 may send a request for connection specifications to the bastion EAMS 110. For example, the connection specifications may include: connection information such as the target network domain necessary for connecting to the target instance, the IP address and port number of the target instance, and the user 1's ID and password; security policies such as anomaly command settings, watermark display, and connection history recording settings; and web terminal settings such as terminal timeout duration, the activation status of a file transfer functionality, and scroll line settings. In step S107, the bastion EAMS 110 may generate and deliver the connection specifications to the bastion manager 120.

In step S108, the bastion manager 120 may open a web terminal on the browser of the user terminal. The settings of the web terminal may be managed by the web terminal management module 114 of the bastion EAMS 110. In step S109, the user 1 may send a request to open a WebSocket for connecting to the target instance.

In step S110, the instance connection module 121 of the bastion manager 120 may search for and find a bastion worker 130 that can connect to the target instance from among a plurality of bastion workers 130 deployed across networks. For example, the bastion manager 120 may search for and find accessible bastion workers 130 based on the target network domain included in the connection specification. Specifically, the routing module 124 of the bastion manager 120 may count the number of concurrent connections to the target instance each time a connection is made or terminated, and may route traffic to a bastion worker 130 with the least connections, among the found accessible bastion workers 130.

In step S111, the instance connection module 121 of the bastion manager 120 may deliver the connection specifications to, and thereby access, the bastion worker 130 that can connect to the target instance. For example, the connection specifications may be delivered to the bastion worker 130 in JSON format, but the present disclosure is not limited thereto. Alternatively, the connection specifications may be delivered in any other format for conveying data objects consisting of key-value pairs. In step S112, the bastion worker 130 may connect to the target instance, and in step S113, the bastion worker 130 may terminate the connection to the target instance.

Figure 8:
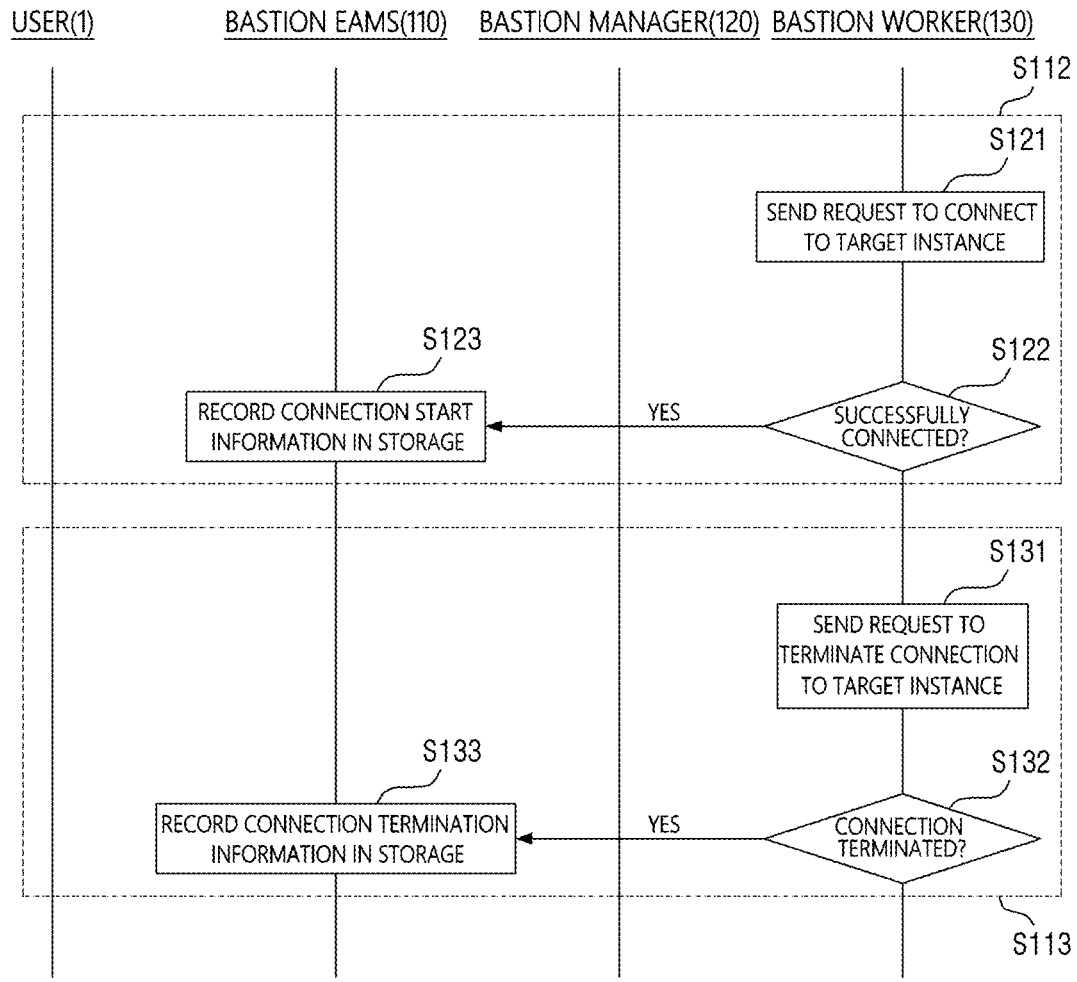
FIG. 8 is a flowchart illustrating steps S112 and S113 of FIG. 7, where the accessed bastion worker connects to, and terminates the connection to, the target instance.

FIG. 8 is a flowchart illustrating steps S112 and S113 of FIG. 7, where the bastion worker 130 connects to, and terminates the connection to, the target instance. The embodiment of FIG. 8 will hereinafter be described with reference further to FIGS. 1 and 2.

Referring to FIG. 8 and further to FIGS. 1 and 2, in step S121, the bastion worker 130 may send a request to connect to the target instance through the network proxy 132, and in step S122, the bastion worker 130 may determine if the connection to the target instance has been successful. If the connection to the target instance has been successful, then in step S123, the bastion EAMS 110 may record connection start information in the storage 2. For example, the connection start information may include the name and IP address of the target instance, connection protocol, the user 1's name and account information, the user 1's IP address, the ID of the target instance, and connection start time.

In step S131, the bastion worker 130 may send a request to terminate the connection to the target instance, and in step S132, the bastion worker 130 may determine if the connection to the target instance has been successfully terminated. Upon disconnection from the target instance, in step S133, the bastion EAMS 110 may record connection termination information in the storage 2. For example, the connection termination information may include the name and IP address of the target instance, the connection protocol, the user 1's name, the user 1's account information, the user 1's IP address, the ID of the target instance, and connection termination time.

Figure 9:
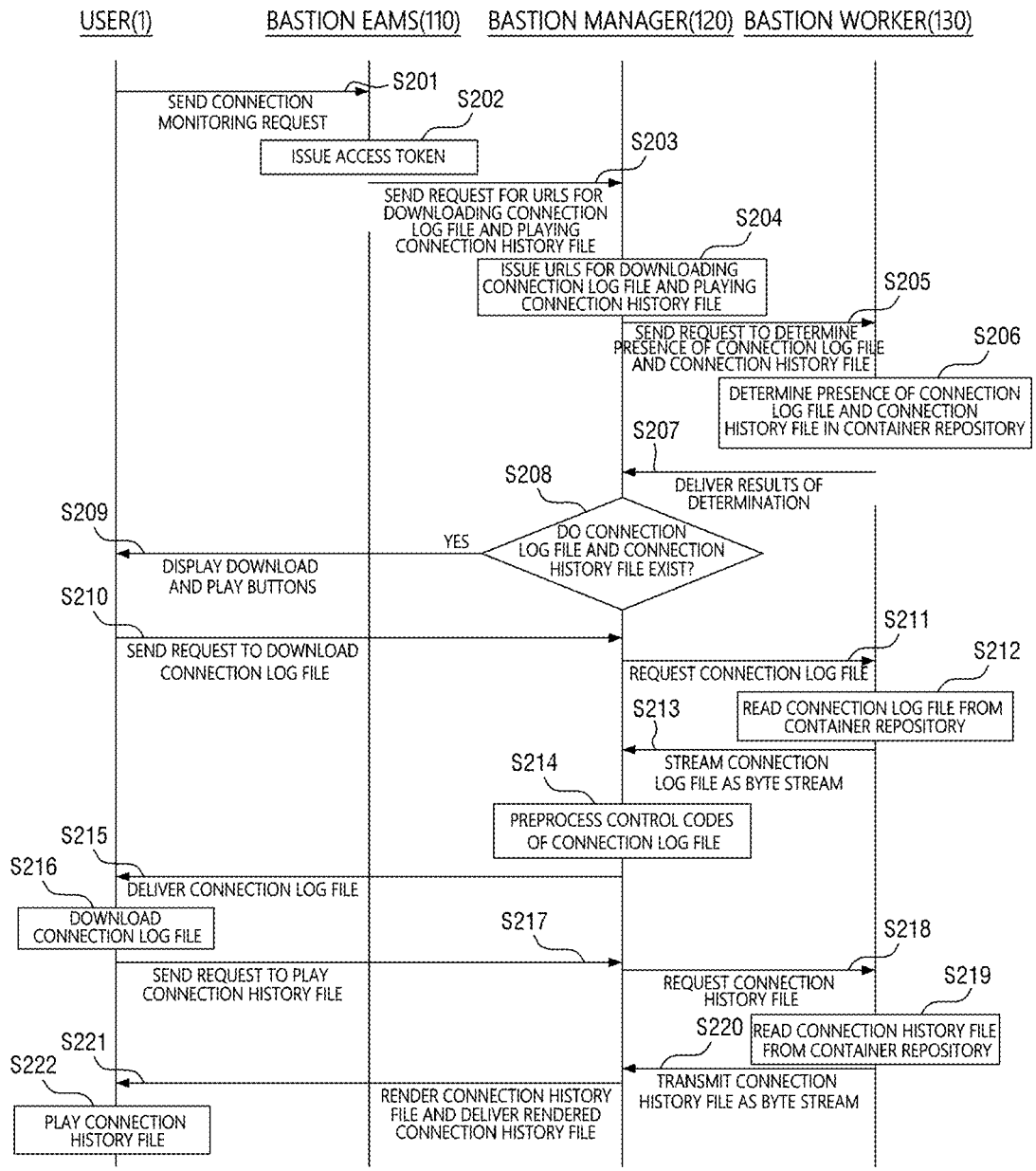
FIG. 9 is a flowchart illustrating step S200 of FIG. 6, which involves downloading a connection log file and playing a connection history file through the bastion host.

FIG. 9 is a flowchart illustrating step S200 of FIG. 6, which involves downloading a connection log file and playing a connection history file through the bastion host 100. The embodiment of FIG. 9 will hereinafter be described with reference further to FIGS. 1 and 2.

Referring to FIG. 9, in step S201, the user 1 may send a connection monitoring request to the bastion EAMS 110. In step S202, in response to the connection monitoring request, the bastion EAMS 110 may issue an access token for server-to-server authentication. In step S203, upon issuance of the access token, the bastion EAMS 110 may send a request for URLs for downloading the connection log file and playing the connection history file to the connection monitoring module 122 of the bastion manager 120.

In step S204, the connection monitoring module 122 of the bastion manager 120 may issue the URLs for downloading the connection log file and playing the connection history file, based on the instance ID generated in step S104 of FIG. 7. For example, the URL for downloading the connection log file may be in the format of "/connector/v1/audit/logging/{InstanceID}", and the URL for playing the connection history file may be in the format of "/connector/v1/audit/playback/{InstanceID}."

In step S205, the connection monitoring module 122 of the bastion manager 120 may send a request to the bastion worker 130 to determine the presence of the connection log file and the connection history file. In step S206, the bastion worker 130 may determine the connection log file and the connection history file in an external container repository via its container repository management module 133, and in step S207, the bastion worker 130 may transmit the results of the determination to the bastion manager 120. In step S208, the bastion manager 120 may determine whether the connection log file and the connection history file exist.

In step S209, if the connection log file and the connection history file are found, the connection monitoring module 122 of the bastion manager 120 may display buttons on the web terminal for downloading the connection log file and playing the connection history file. That is, the user 1 may click these buttons on the web terminal via a browser to download the connection log file or play the connection history file.

Thereafter, for the download of the connection log file, in step S210, the user 1 may send a request to the bastion manager 120 to download the connection log file using the corresponding issued URL. In step S211, the connection monitoring module 122 of the bastion manager 120 may send a request for the connection log file to the bastion worker 130. In step S212, the bastion worker 130 may retrieve the connection log file from the external container repository, and in step S213, the bastion worker 130 may transmit the retrieved connection log file to the bastion manager 120. For example, the bastion worker 130 may transmit the connection log file as a byte stream, but the present disclosure is not limited thereto.

In step S214, the connection monitoring module 122 of the bastion manager 120 may preprocess control codes in the connection log file. For example, the connection monitoring module 122 may remove unnecessary ASCII codes from the connection log file and may convert the connection log file into a format readable by the user 1. In step S215, the bastion manager 120 may deliver the preprocessed connection log file to the user 1. Consequently, in step S216, the user 1 may download the connection log file.

Thereafter, for the play of the connection history file, in step S217, the user 1 may send a request to the bastion manager 120 to play the connection history file using the corresponding issued URL. In step S218, the connection monitoring module 122 of the bastion manager 120 may send a request for the connection history file to the bastion worker 130. In step S219, the bastion worker 130 may retrieve the connection history file from the external container repository, and in step S220, the bastion worker 130 may transmit the retrieved connection history file to the bastion manager 120. For example, the connection history file, like the connection log file, may be transmitted as a byte stream, but the present disclosure is not limited thereto. In step S221, the bastion manager 120 may render the connection history file and may deliver the rendered connection history file to the user 1, and in step S222, the user 1 may play the rendered connection history file.

Figure 10:
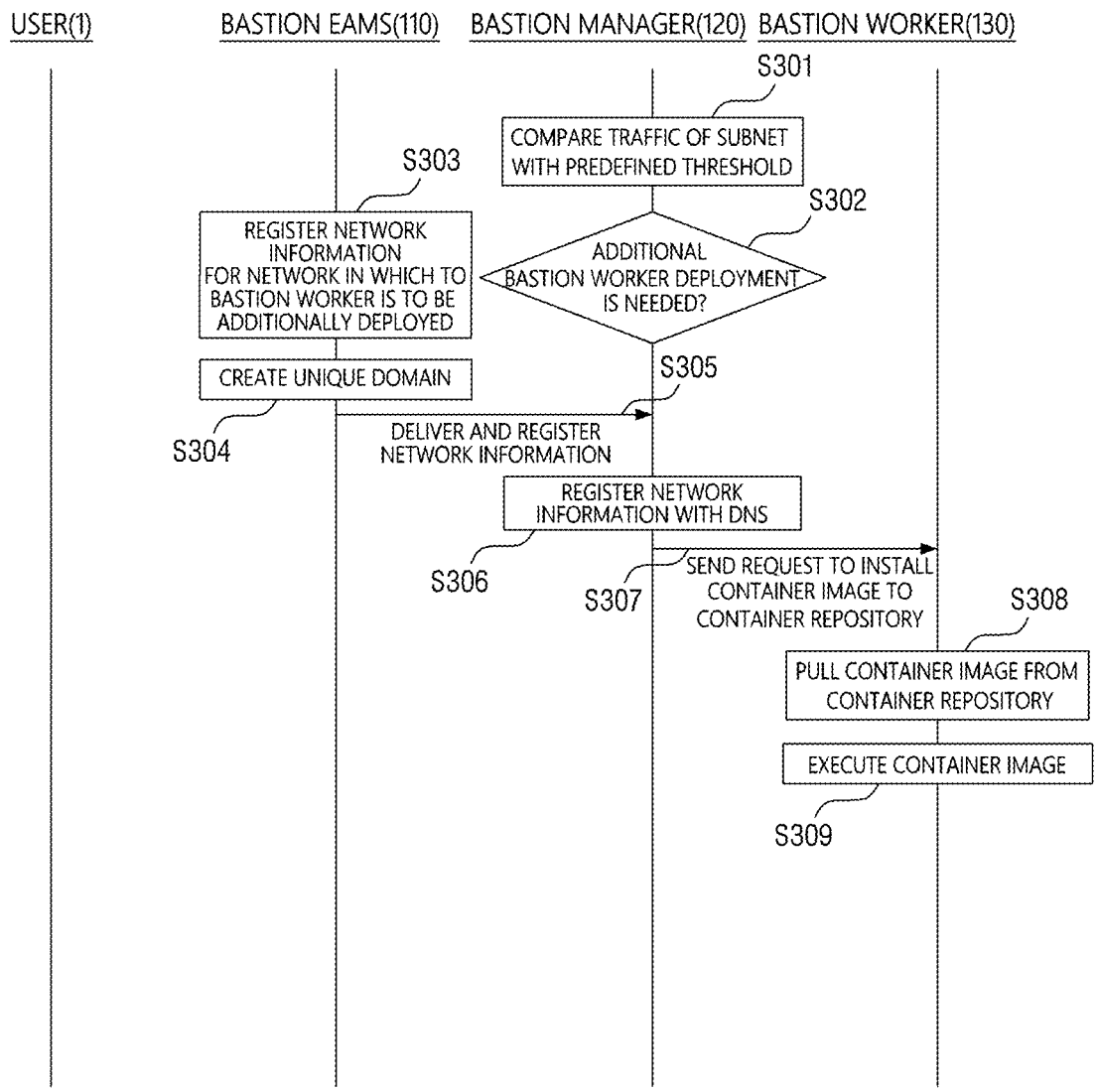
FIG. 10 is a flowchart illustrating step S300 of FIG. 6, which involves comparing measured traffic with a pre-defined threshold and adjusting the number of bastion workers based on the results of the comparison.

FIG. 10 is a flowchart illustrating step S300 of FIG. 6, which involves comparing measured traffic with a predefined threshold and adjusting the number of bastion workers based on the results of the comparison. The embodiment of FIG. 10 will hereinafter be described with reference further to FIGS. 1, 2, and 5.

In step S301, the connection monitoring module 121 of the bastion manager 120 may measure traffic from a subnet (e.g., the subnet where the target instance is located) and may compare the measured traffic with a predefined threshold to determine if the deployment of additional bastion workers 130 is necessary. For example, the bastion manager 120 may determine whether the traffic of the subnet where the target instance is located exceeds the predefined threshold.

In step S302, if it is determined that additional deployment of bastion workers 130 is needed (e.g., if the subnet traffic exceeds the predefined threshold), then in step S303, the bastion EAMS 110 may register network information for the network in which bastion workers 130 are to be additionally deployed (e.g., the name of the network, the list of IP addresses of bastion workers 130, etc.). In step S304, the bastion EAMS 110 may create a unique domain for DNS registration. For example, the bastion EAMS 110 may generate a unique domain by creating a NetworkKey value using the combination of the name of the network and a universally unique identifier (UUID). For example, the generated unique domain may be in the format of "{NetworkKey}.connector.io" and may be included in the network information along with the name of the network name and the list of bastion worker IP addresses.

In step S305, the bastion EAMS 110 transmits and registers the network information with the bastion manager 120, and in step S306, the bastion EAMS 110 may register the network information in the DNS. In step S307, the deployment module 123 of the bastion manager 120 may send a request to install a container image corresponding to a bastion worker 130 to be deployed.

In step S308, in response to a deployment request from the deployment module 123 of the bastion manager 120, the bastion worker 130 to be additionally deployed may pull the container image from the external container repository (e.g., a Docker repository or K8s). In step S309, the bastion worker 130 to be additionally deployed may execute the container image. For example, the container image may be implemented on the web proxy container 131 of the bastion worker 130 to be additionally deployed. Once the container image is executed, the deployment of the bastion worker 130 to be additionally deployed may be completed. As the additional bastion worker 130 is deployed, the load of the network can be distributed.

Figure 11:
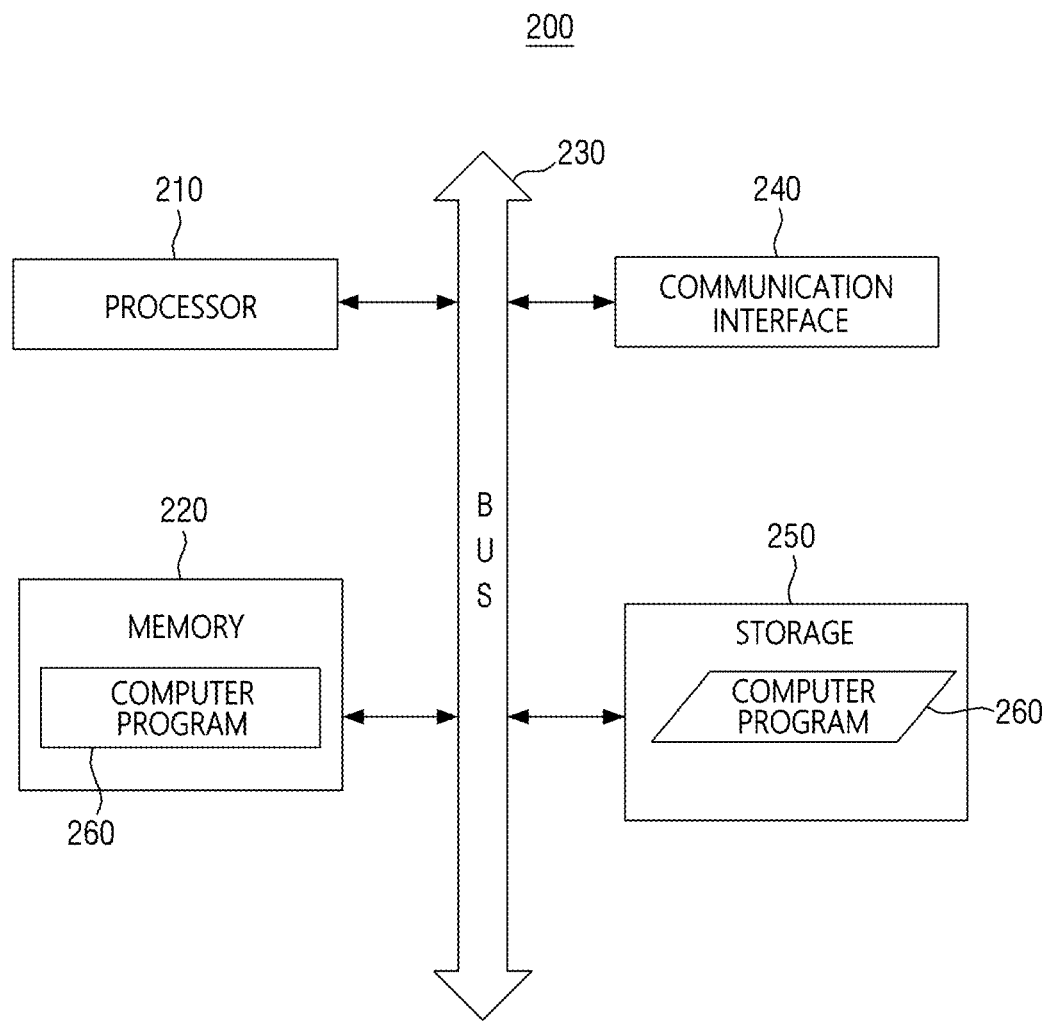
FIG. 11 is a block diagram illustrating the hardware configuration of a computing device for connecting to and managing connections to instances in a multi-network environment according to an embodiment of the present disclosure.

FIG. 11 is a block diagram illustrating the hardware configuration of a computing device 200 for connecting to and managing connections to instances in a multi-network environment according to an embodiment of the present disclosure. The embodiment of FIG. 11 will hereinafter be described with reference further to FIGS. 1 and 2.

Referring to FIG. 11, the computing device 200 may include at least one processor 210, a bus 230, a communication interface 240, a memory 220, which loads a computer program 260 executed by the processor 210, and a storage 250, which stores the computer program 260. However, FIG. 11 illustrates only relevant components to the present disclosure. Therefore, it is obvious to one of ordinary skill in the art to which the present disclosure pertains that the computing device 200 may further include other generic components than those depicted in FIG. 11. In other words, the computing device 200 may also include various other components to those depicted in FIG. 11. Additionally, the computing device 200 may be configured without some of the components depicted in FIG. 11. The components of the computing device 200 will hereinafter be described.

The processor 210 may control the overall operations of the components of the computing device 200. The processor 210 may be configured to include at least one of a Central Processing Unit (CPU), a Micro Processor Unit (MPU), a Micro Controller Unit (MCU), a Graphic Processing Unit (GPU), or any type of processor well known in the field of the present disclosure. Moreover, the processor 210 may perform computations for at least one application or program for executing operations/methods according to some embodiments of the present disclosure. The computing device 200 may be equipped with at least one processor 210.

The memory 220 may store various data, instructions, and/or information. The memory 220 may load the computer program 260 from the storage 250 to execute the operations/methods according to some embodiments of the present disclosure. The memory 220 may be implemented as a volatile memory such as a random-access memory (RAM), but the present disclosure is not limited thereto.

The bus 230 may provide communication functions between the components of the computing device 200. The bus 230 may be implemented in various forms such as an address bus, a data bus, and a control bus.

The communication interface 240 may support wired or wireless internet communication for the computing device 200. Moreover, the communication interface 240 may support various communication methods besides Internet communication. For this purpose, the communication interface 240 may be configured to include a communication module well-known in the technical field of the present disclosure.

The storage 250 may non-transiently store the computer program 260. The storage 250 may be configured to include a non-volatile memory such as a Read-Only Memory (ROM), an Erasable Programmable ROM (EPROM), an Electrically Erasable Programmable ROM (EEPROM), a flash memory, a hard disk, a removable disk, or any form of computer-readable recording medium well known in the technical field of the present disclosure.

The computer program 260 may include one or more instructions that, when loaded into the memory 220, allow the processor 210 to perform the operations/methods according to some embodiments of the present disclosure. That is, by executing the loaded instructions, the processor 210 may perform the operations/methods according to some embodiments of the present disclosure.

For example, the computer program 260 may include instructions for performing the operations of: accessing the bastion EAMS 110; issuing, by the bastion EAMS 110, an access token through user authentication; sending, by the bastion EAMS 110, a request to connect to the target instance; generating and delivering, by the bastion EAMS 110, connection specifications to the bastion manager 120; searching for and finding, by the bastion manager 120, a bastion worker 130 that can connect to the target instance; allowing the user 1 to download the connection log file and play the connection history file; and adjusting the number of bastion workers 130 based on the traffic measured by the bastion manager 120.

According to the aforementioned embodiments of the present disclosure, a bastion EAMS and a bastion manager that form a bastion host together can communicate bidirectionally, but communication between the bastion manager and bastion workers is restricted to being unidirectional, from the bastion manager 120 to the bastion workers 130, effectively blocking communication from external networks to the user network and preventing exposure of instance information externally.

According to the aforementioned embodiments of the present disclosure, connecting to and managing connections to instances in a multi-network environment according to embodiments of the present disclosure can be performed through the computing device 200, and the user 1 can connect to each target instance through bastion workers 130 in other networks using the computing device 200.

Furthermore, according to the aforementioned embodiments of the present disclosure, the number of bastion workers can be adjusted based on subnet traffic or the type of network, allowing for the distribution of load in cases of extremely high traffic. Therefore, compared to installing a bastion host on each network within a cloud service or connecting to instances through VPC peering between networks that constitute the cloud service, the cloud service administrator can efficiently manage the networks, and the inconveniences and security risks associated with individual instance connections can be mitigated.

Various embodiments and the effects thereof according to the present disclosure have been mentioned with reference to FIGS. 1 through 11. The effects according to the technical spirit of the present disclosure are not limited to those mentioned above, and other effects not mentioned will be clearly understood by one of ordinary skill in the art from the description below.

While all components comprising the embodiments of the present disclosure have been described as being combined or operating in conjunction, it should not be understood that the present disclosure is limited to such embodiments. That is, within the scope of the objectives of the present disclosure, all such components can selectively be combined and operate in one or more configurations.

Although operations are illustrated in a specific order in the drawings, it should not be understood that the operations must be performed in that specific order or sequentially, or that all the illustrated operations are required to achieve desired results. In certain circumstances, multitasking and parallel processing may be advantageous. Furthermore, the separation of various components in the described embodiments should not be understood as necessary, and the described program components and systems can generally be integrated into a single software product or packaged into multiple software products.

While the embodiments of the present disclosure have been described with reference to the attached drawings, it will be understood by one skilled in the art that the present disclosure can be implemented in other specific forms without departing from the technical spirit or essential characteristics thereof. Therefore, the described embodiments should be considered in all respects as illustrative and not restrictive. The scope of the present disclosure is to be interpreted by the following claims, and all technical spirits within the equivalent scope are to be interpreted as included within the rights of the present disclosure.

What is claimed is:

1. A method of connecting to and managing connections to instances in a multi-network environment, the method comprising:
accessing, by a bastion host, a bastion worker among bastion workers, the bastion workers being included in subnets of a plurality of networks, and connecting to a target instance connected with the accessed bastion worker;
monitoring, by the bastion host, a connection to the target instance; and
comparing, by the bastion host, a traffic of a subnet, in which the target instance is located, with a predefined threshold, and adjusting a number of a bastion worker included in the subnet, in which the target instance is located, based on a result of the comparing,
wherein the traffic includes data obtained from a result of the monitoring the connection to the target instance.

2. The method of claim 1, wherein the connecting to the target instance comprises:
performing, by a bastion Equipment Account Management System (EAMS) of the bastion host, a user authentication;
receiving, by a bastion manager of the bastion host, a request to connect to the target instance;
in response to the request to connect to the target instance, transmitting, by the bastion manager, a request for connection specifications to the bastion EAMS;
generating and transmitting, by the bastion EAMS, the connection specifications to the bastion manager, in response to the request for connection specifications;
searching for and locating a bastion worker, among the bastion workers, that is connected to the target instance; and
accessing the located bastion worker by using the connection specifications.

3. The method of claim 2, wherein the connection specifications include a domain of a network in which the target instance is located, an IP address and a port number of the target instance, an ID and a password of a user, and at least one setting associated with the monitoring the connection to the target instance.

4. The method of claim 2, wherein the accessing the located bastion worker comprises transmitting the connection specifications to the located bastion worker in a JSON format.

5. The method of claim 2, wherein the connecting to the target instance comprises:
transmitting a request to connect to the target instance through the accessed bastion worker;
transmitting the connection specifications in JSON format to the located bastion worker; and
recording, based on the connecting to the target instance being successful, connection start information, the connection start information including a name and an IP address of the target instance, a connection protocol used, a name and an account information of a user, an IP address of a user terminal, an ID of the target instance, and a connection start time.

6. The method of claim 5, further comprising:
based on the connection to the target instance being terminated, recording connection termination information in a storage,
wherein the connection termination information includes the IP address of the target instance, the connection protocol used, the ID and the account information of the user, the IP address of the user terminal, and a connection termination time.

7. The method of claim 1, wherein the monitoring the connection to the target instance comprises:
measuring the traffic of the subnet in which the target instance is located;
providing, to a user, a connection log file that includes one or more operations performed by the user upon the connecting to the target instance; and
providing, to the user, a connection history file, the connection history file being a video file that records operations performed through the bastion host up to a point of the connecting to the target instance.

8. The method of claim 7, wherein the providing the connection log file comprises:
in response to a request to download the connection log file from the user, transmitting, by a bastion manager of the bastion host, a request for the connection log file to the accessed bastion worker;
receiving, by the bastion manager, the connection log file from the accessed bastion worker;
preprocessing, by the bastion manager, control codes of the connection log file; and transmitting, by the bastion manager, the connection log file to the user.

9. The method of claim 7, wherein the providing the connection history file comprises:
in response to a request to play the connection history file from the user, transmitting, by a bastion manager of the bastion host, a request for the connection history file to the accessed bastion worker;
receiving, by the bastion manager, the connection history file from the accessed bastion worker; and
rendering, by the bastion manager, the connection history file and transmitting the rendered connection history file to the user.

10. The method of claim 1, wherein the adjusting the number of the bastion worker comprises additionally deploying at least one bastion worker in the subnet based on the traffic of the subnet exceeding the predefined threshold.

11. The method of claim 10, wherein the additionally deploying at least one bastion worker comprises:
registering, by a bastion manager of the bastion host, network information for the subnet in which the at least one bastion worker is to be additionally deployed; and
transmitting a request to install a container image corresponding to the at least one bastion worker to be deployed.

12. The method of claim 11, wherein the container image corresponding to the at least one bastion worker to be additionally deployed is pulled from a container repository that is Kubernetes (K8s) or a Docker repository.

13. A system for connecting to and managing connections to instances in a multi-network environment, wherein each of a plurality of networks includes a bastion worker and a plurality of instances connected with the bastion worker, the system comprising:
a user network including a bastion host for a user to access bastion workers included in a plurality of networks, wherein the bastion host includes:
a bastion Equipment Account Management System (EAMS) configured to perform a user authentication on the user and transmit a request to connect to a target instance among the plurality of instances; and
a bastion manager configured to search for and locate a bastion worker connected with the target instance, in response to the request to connect to the target instance from the bastion EAMS;
access the located bastion worker, measure traffic of a subnet, in which the target instance is located, and compare the measured traffic with a predefined threshold; and
adjust a number of a bastion worker included in the subnet, in which the target instance is located, based on a result of the comparing.

14. The system of claim 13, wherein upon a request from the bastion manager, the bastion EAMS is configured to generate and delivers specifications to the bastion manager, and
wherein the bastion manager is configured to access the located bastion worker by using connection specifications.

15. The system of claim 14, wherein the connection specifications include a domain of a network where the target instance is located, an IP address and a port number of the target instance, an ID and a password of the user, and settings associated with monitoring of a connection to the target instance.

16. The system of claim 13, wherein the bastion manager includes a connection monitoring module, configured to provide, to the user, a connection log file that includes one or more operations performed by the user upon the connecting to the target instance, and configured to provide, to the user, a connection history file that is a video file that records operations performed through the bastion host up to a point of connecting to the target instance.

17. The system of claim 13, wherein the bastion manager includes a deployment module, configured to deploy one of the bastion workers as a container image and additionally deploy at least one other bastion worker based on the traffic exceeding the predefined threshold.

18. The system of claim 13, wherein the bastion worker includes a web proxy container and a network proxy,
wherein each of the bastion workers is implemented as a container image on the web proxy container, and
wherein the bastion manager is configured to connect to the target instance through the network proxy according to a traffic routed from the bastion manager.

19. The system of claim 18, wherein the container image is received from a container repository upon a deployment request from the bastion manager, and
wherein the container repository is Kubernetes (K8s) or a Docker repository.

20. A non-transitory computer-readable recording medium storing computer program executable by at least one processor to perform:
accessing a bastion worker among bastion workers, the bastion workers being included in subnets of a plurality of networks, and connecting to a target instance connected with the accessed bastion worker;
monitoring a connection to the target instance; and
comparing a traffic of a subnet, in which the target instance is located, with a predefined threshold, and adjusting a number of a bastion worker included in the subnet, in which the target instance is located, based on a result of the comparing,
wherein the traffic includes data obtained from a result of the monitoring.

* * * * *